US008171350B2

(12) United States Patent
Underwood (10) Patent No.: US 8,171,350 B2
(45) Date of Patent: *May 1, 2012

(54) METHOD AND SYSTEM FOR PROVIDING AUTOMATIC DISABLING OF NETWORK DEBUGGING

(75) Inventor: Gerald E. Underwood, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/894,597

(22) Filed: Sep. 30, 2010

(65) Prior Publication Data

US 2011/0016210 A1    Jan. 20, 2011

Related U.S. Application Data

(63) Continuation of application No. 11/772,403, filed on Jul. 2, 2007, now Pat. No. 7,836,354.

(51) Int. Cl.
*G06F 11/00* (2006.01)

(52) U.S. Cl. ............... 714/47.1; 714/48; 714/25
(58) Field of Classification Search ........... 714/47, 714/10, 25, 30, 31, 35, 481, 47.1
See application file for complete search history.

(56) References Cited

U.S. PATENT DOCUMENTS

| | | | | |
|---|---|---|---|---|
| 6,269,398 B1 * | 7/2001 | Leong et al. | .................. | 709/224 |
| 6,449,576 B1 * | 9/2002 | Bass et al. | .................... | 702/117 |
| 6,854,073 B2 * | 2/2005 | Bates et al. | ................. | 714/38.13 |
| 2004/0010778 A1 * | 1/2004 | Kaler et al. | .................... | 717/130 |
| 2007/0253411 A1 * | 11/2007 | Arad et al. | .................... | 370/389 |

* cited by examiner

*Primary Examiner* — Scott Baderman
*Assistant Examiner* — Sarai Butler (57) ABSTRACT

An approach is provided for automatic disabling of network debugging. A debugging command is received for initiating debugging of a router that includes a processor configured to execute a debugging procedure. Utilization of the processor is monitored. A determination is made whether the utilization exceeds a utilization threshold. The debugging procedure is disabled based on the determination that the utilization threshold is exceeded.

20 Claims, 6 Drawing Sheets

METHOD AND SYSTEM FOR PROVIDING AUTOMATIC DISABLING OF NETWORK DEBUGGING

RELATED APPLICATIONS

The present application is a continuation of U.S. patent application Ser. No. 11/772,403 filed on Jul. 2, 2007, the contents of which is hereby incorporated by reference.

BACKGROUND OF THE INVENTION

Modern communication systems involve a delicate interplay of network components that support voice and data services. These systems are vital to business operations, such that downtime imposes a significant cost to the business. Ensuring that networks perform to their architected availability and mitigating the risk of downtime are key drivers for information managers. The impact of network downtime results in real monetary losses to the organizations. To improve network availability, various tools have been developed to diagnose network problems at the device level (i.e., network components). Ironically, some of these tools can cause the network components to endure greater processing loads, which can in turn trigger "crashes" of the network components themselves.

Based on the foregoing, there is a need for effectively debugging network components, while preventing overwhelming the processing resources of these components.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENTS

A system, method, and software for providing automatic disabling of network debugging are described. In the following description, for the purposes of explanation, numerous specific details are set forth in order to provide a thorough understanding of the present invention. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various exemplary embodiments are described with respect to a routing network and Simple Network Management Protocol (SNMP), it is contemplated that these embodiments have applicability to other data communication systems and equivalent protocols.

Figure 1:
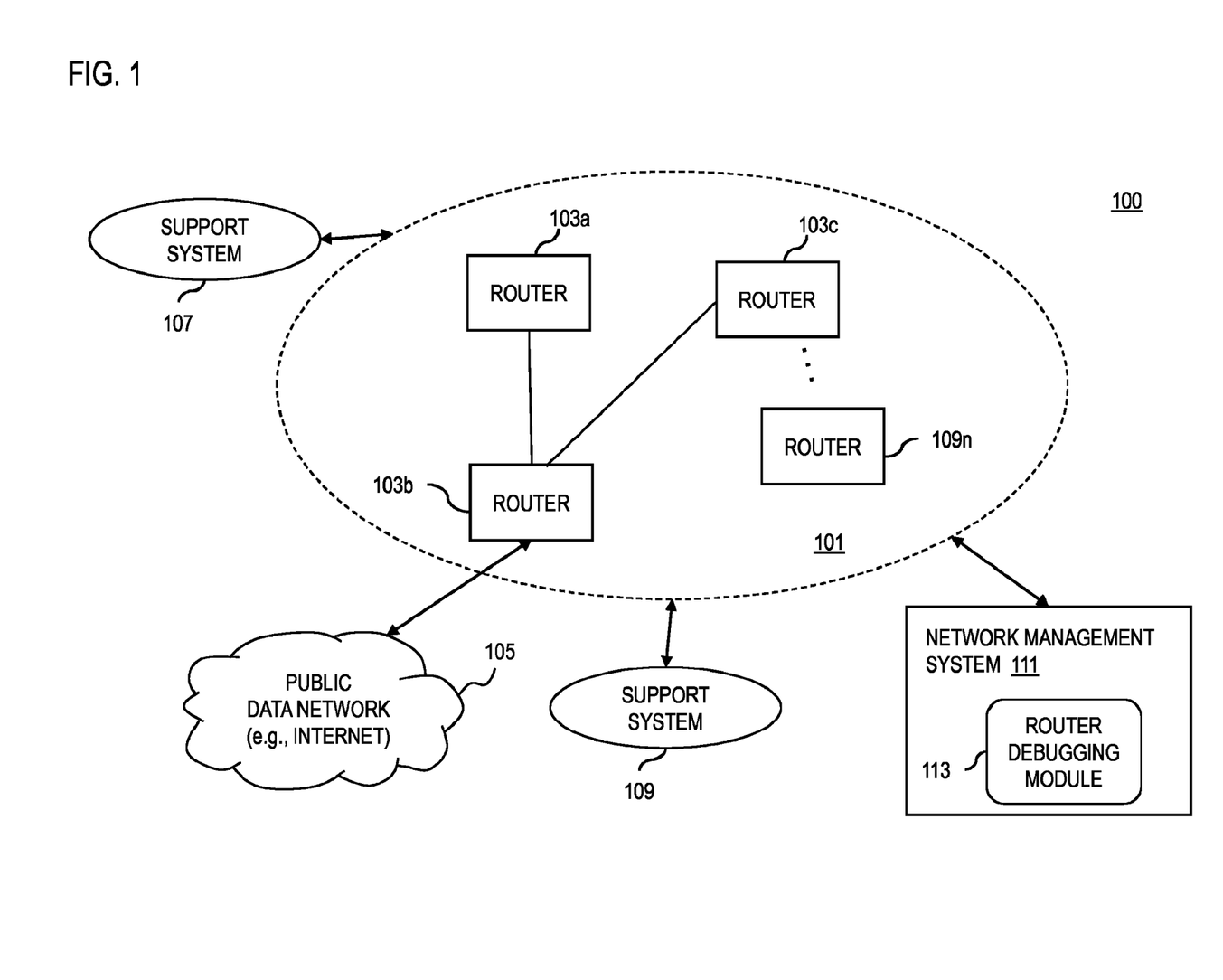
FIG. 1 is a diagram of a data communication system capable of providing automatic disabling of network debugging, according to an exemplary embodiment.

FIG. 1 is a diagram of a data communication system capable of providing automatic disabling of network debugging, according to an exemplary embodiment. For the purposes of illustration, a communication system 100 employs a router-based data network 101 that includes an array of routers 103a-103n, which, in general terms, provide interfaces between two networks. Thus, routers are deployed at gateways—i.e., a gateway is a point in which one network meets another. For instance, the router 103b interfaces with a point-of-presence on a public data network 105 (e.g., the Internet). In one embodiment, the routers 103a-103n operate at the physical layer, link layer and network layer of the Open Systems Interconnection (OSI) model to transport data across the network 101. The routers 103a-103n determine the "best" paths or routes through the network 101 by utilizing various routing protocols. Routing tables are maintained by each router for mapping input ports to output ports using information from routing protocols. Exemplary routing protocols include Border Gateway Protocol (BGP), Interior Gateway Routing Protocol (IGRP), Routing Information Protocol (RIP), and Open Shortest Path First (OSPF). In addition to intelligently forwarding data, the routers 103a-103n can provide various other functions, such as firewalling, encryption, etc.

Figure 6:
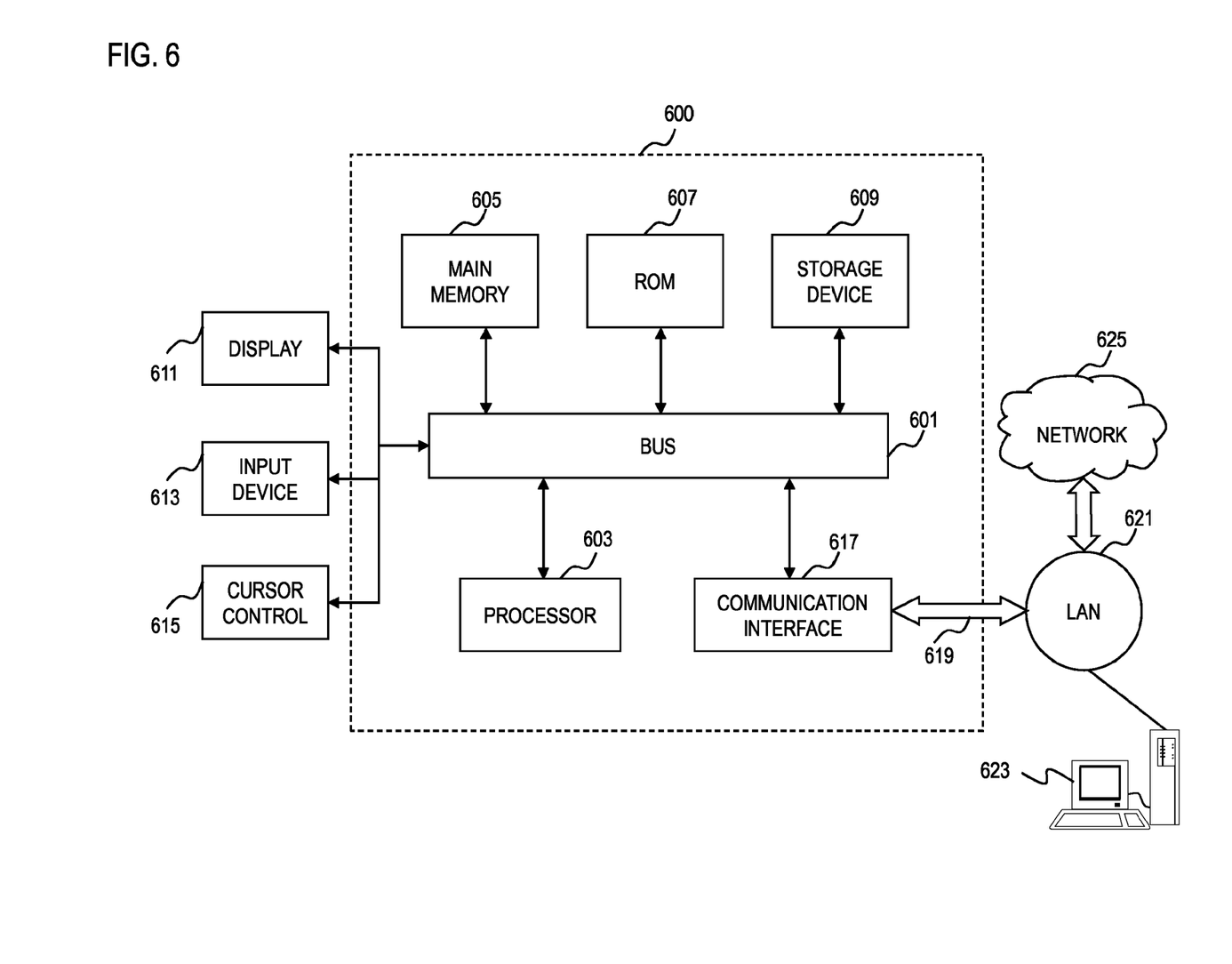
FIG. 6 is a diagram of a computer system that can be used to implement various exemplary embodiments.

These router functions can be performed using a general purpose computer (as shown in FIG. 6), or be highly specialized hardware platform with greater processing capability to process high volumes of data and hardware redundancies to ensure high reliability.

The routers 103a-103n in effect transport data from a source to a destination through the use of routing algorithms. Such routing algorithms include distance vector algorithms and link state algorithms; any one or a combination of such algorithms can be utilized in the routing network 101. Under the distance vector scheme, a "cost" is assigned to each of the links between each node in the network, in which the path with the lowest cost is selected. With link-state algorithms, each node independently generates a map of the network in the form of a graph, and selects a least-cost path to every other node. A tree of the least-cost paths is produced and is used to construct a routing table.

In an exemplary embodiment, the network 101 is maintained by a service provider. The service provider can utilize one or more support systems 107 and 109 to support its operations. For example, the support system 107 can be service provisioning system for procuring services for subscribers, while support system 109 can be workforce management or troubleshooting system. The service provider may permit these internal support systems 107 and 109 to control one or more routers within the network 101. In one embodiment, the systems 107 and 109 possess the capability to perform debugging of their serving routers. Debugging is necessary to address performance issues and network failure/recovery. It is noted that one or more of these routers 103a-103n can be shared between the two support systems 107 and 109. Because a router is shared, the flexibility for each support system 107 to manage its own router can, however, negatively impact service for the other support system 109. It is recognized that haphazard or careless debugging can overwhelm the processing capacity of the router as debugging output is treated with high priority over other processes, thereby potentially resulting in a crash. Thus, service disruption is experienced by all systems 107 and 109 served by the incapacitated router.

As shown, the service provider can also initiate debugging of any router 103a-103n within the network 101 through a network management system 111. The network management system 111 includes a router debugging module 113, which can issue a router debugging command to the routers 103a-103n. Exemplary debugging commands are enumerated in Table 1:

TABLE 1

| COMMAND | DESCRIPTION |
|---|---|
| debug? | Enables debugging of the device/object specified in "?"-e.g., debug router1 |
| debug all | Enables all diagnostics |
| no debug all | Disables all diagnostic output |

As evident from the above table, the use of the "debug all" command can consume significant CPU capacity to execute all diagnostic procedures if used indiscriminately.

Figure 2:
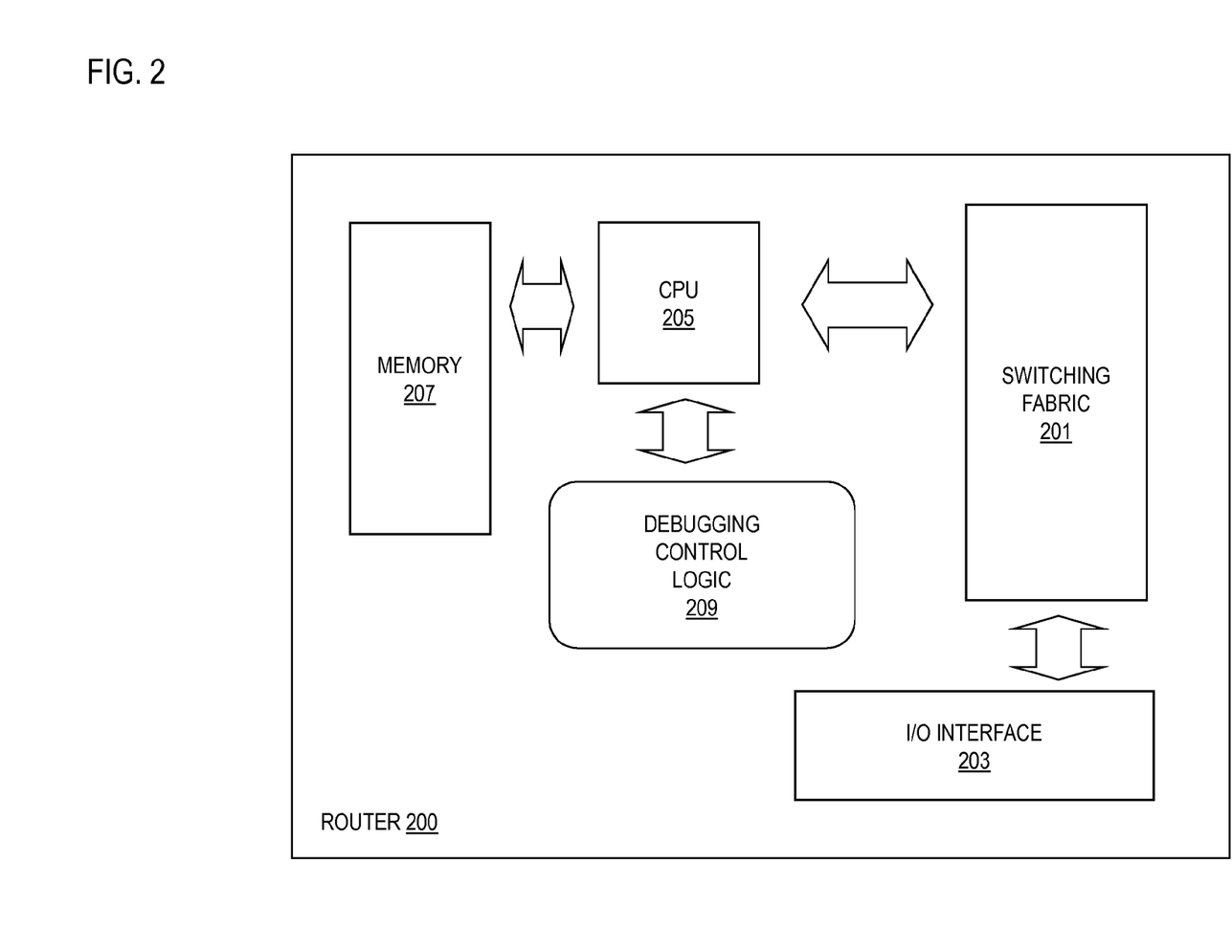
FIG. 2 is a diagram of a router utilizing debugging control logic, according to various exemplary embodiments.

FIG. 2 is a diagram of a router utilizing debugging control logic, according to various exemplary embodiments. By way of example, a router 200 includes a switching fabric 201 that couples to an input/output interface 203 for receiving and forwarding data (e.g., Internet Protocol (IP) packets). A central processing unit (CPU) 205 is configured to execute instructions and commands associated with forwarding the data. The router 200 also utilizes non-volatile memory 207, which can stores routing information (e.g., routing table). In an exemplary embodiment, debugging control logic 209 is provided to instruct the CPU 205 how to perform router debugging. This debugging control logic 209 monitors CPU utilization, and terminates or disables the debugging procedure if the CPU utilization exceeds a predetermined threshold; this process is more fully described with respect to FIG. 3. According to one embodiment, the debugging control logic 209 can implement various software architectures—e.g., use of an event manager as shown in FIG. 4.

Figure 3:
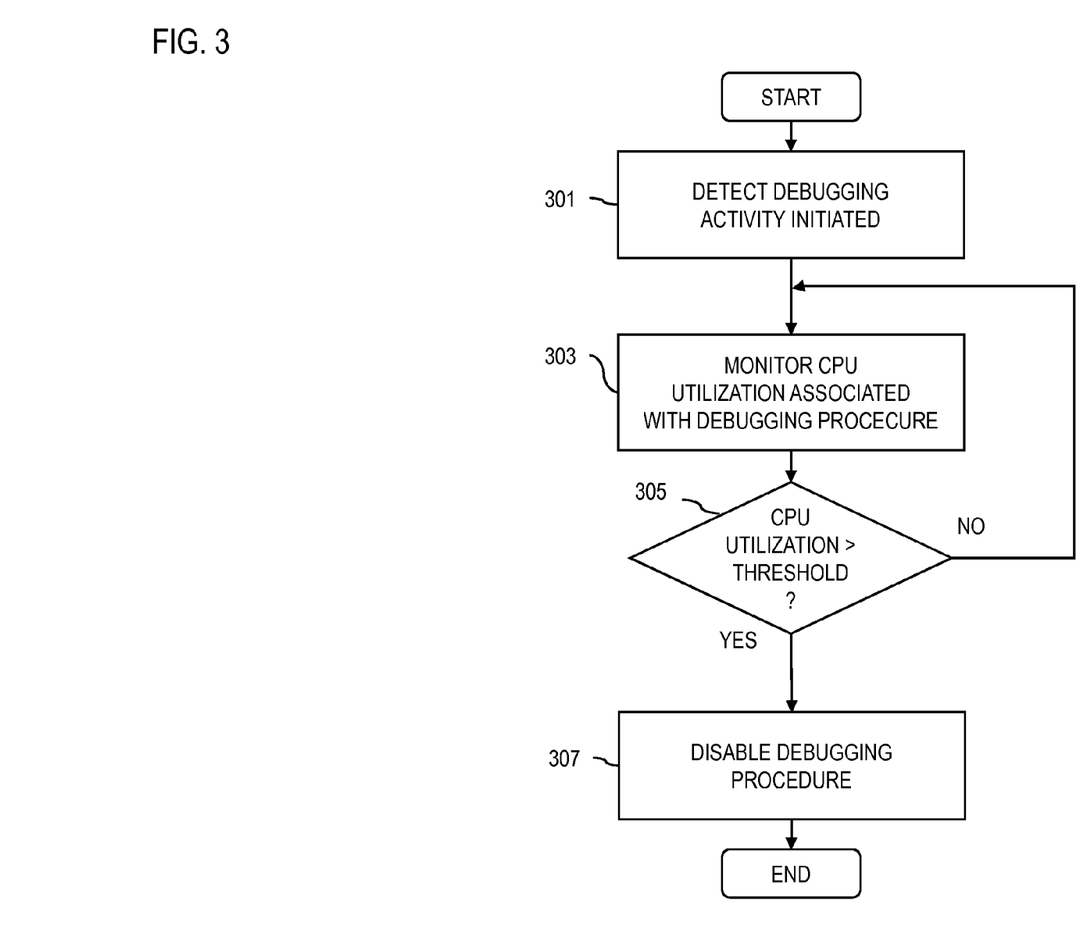
FIG. 3 is a flowchart of a process for providing automatic disabling of network debugging, according to an exemplary embodiment.

FIG. 3 is a flowchart of a process for providing automatic disabling of network debugging, according to an exemplary embodiment. Continuing with the example of FIG. 2, in step 301, debugging activity is initiated and detected by the debugging control logic 209. As a result, the utilization of the CPU 205 is monitored, as in step 303. The control logic 209 then determines whether the CPU utilization level exceeds a utilization threshold (e.g., 80%), per step 305. If the utilization threshold is exceeded (or otherwise satisfied), then the debugging procedure is disabled (step 307). Hence, the router 200 can avoid crashing, stemming from CPU overload.

Figure 4:
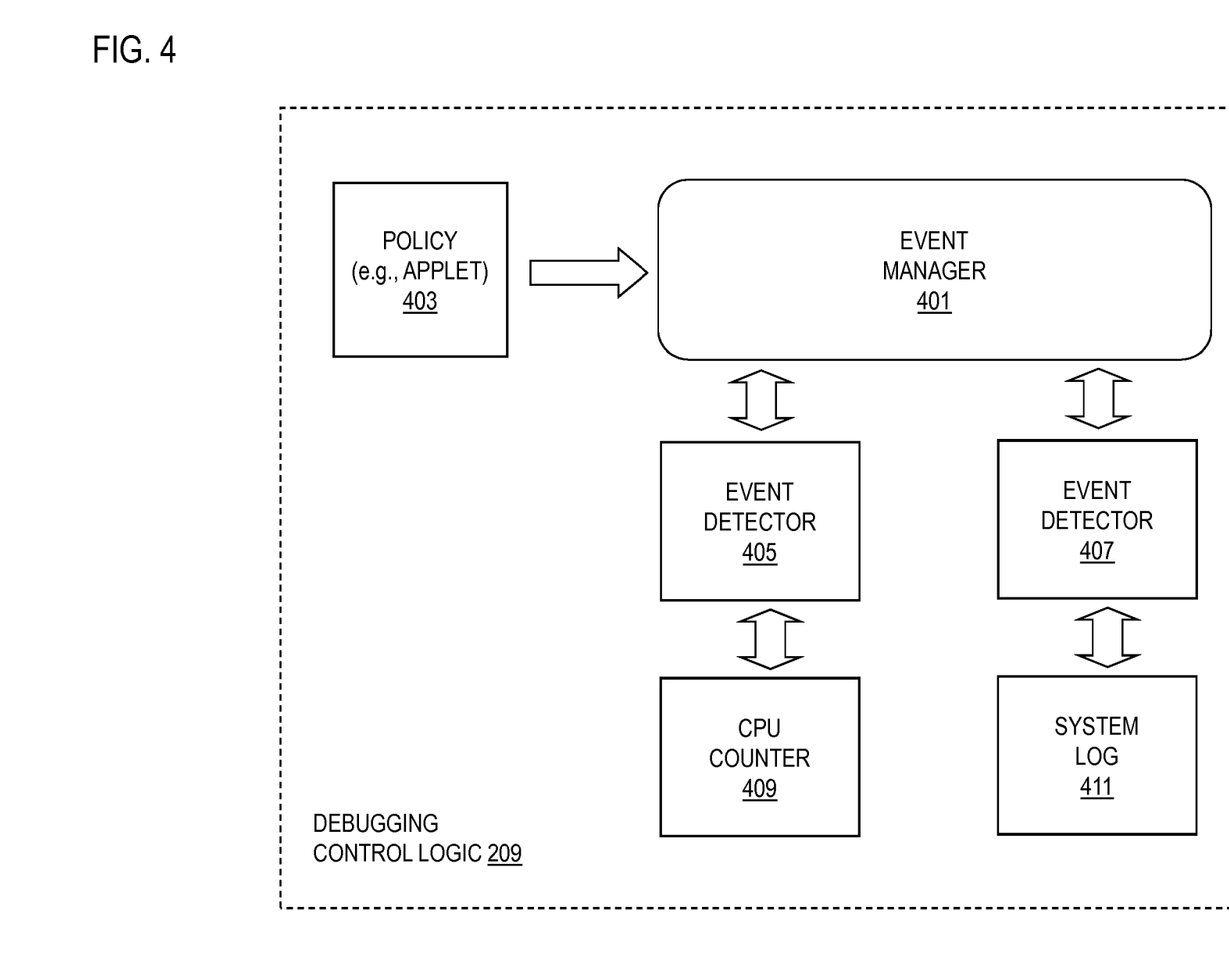
FIG. 4 is a diagram of an event manager for providing automatic disabling of network debugging by monitoring processor utilization, according to an exemplary embodiment.

FIG. 4 is a diagram of an event manager for providing automatic disabling of network debugging by monitoring processor utilization, according to an exemplary embodiment. In this example, the debugging control logic 209 includes an event manager 401 that performs event management involving a policy 403 and one or more event detectors 405, 407 for detecting occurrence of the events. The policy 403 defines events associated with the operation of the router 200 as well as the corresponding actions to be performed upon triggering of such events. The event detector 405 couples to a CPU counter 409 to track CPU utilization. The event detector 407 corresponds to a system log 411, which records the events and associated activities of the router 200.

In an exemplary embodiment, the policy 403 is implemented using an applet, which is a small application (or mini-program) that is embedded in a larger application. This small application can typically be downloaded quickly; the applet can be distributed by the network management system 111 via the router debugging module 113, for example. A network management object is defined according to a Simple Network Management Protocol (SNMP) to correspond to CPU load. SNMP is a request-reply protocol that operates between a manager and an agent. The manager and agent use a Management Information Base (MIB) and a set of commands (e.g., GET, GET-NEXT, GET-RESPONSE, SET, and TRAP) to exchange information about devices. The MIB specifies information about the managed objects, and utilizes a numeric tag or object identifier (OID) for distinguishing variables in the MIB and SNMP messages. That is, each managed object in a MIB is assigned a unique identifier, which can include the object's type (e.g., counter, string, gauge, or address), the object's access level (e.g., read or read/write), size restrictions, and range information. Details of SNMP are more fully described in Internet Engineering Task Force (IETF) Request for Comments (RFCs) 1157 (SNMP), 1902 (MIB Structure), 1903 (Textual Conventions), 1904 (Conformance Statements), 1905 (Protocol Operations), 1906 (Transport Mapping), and 1907 (MIB); which are incorporate herein by reference in their entireties.

Under this scenario, the event manager 401 conforms to CISCO SYSTEMS™ Embedded Event Manager (EEM), which is a part of CISCO Internetwork Operating System (IOS) and provides an interface between a monitored agent and action policies. Table 2 defines an applet that can provide an "Instant OFF" debugging configuration:

TABLE 2 event manager applet CPU_LOAD
event snmp oid 1.3.6.1.4.1.9.2.1.56.0 get-type exact entry-op gt entry-val 80 poll-interval 5
action command1 cli command "enable"
action command2 cli command "undebug all"
action log syslog priority warnings msg "EEM applet executed due to high CPU"

The above defined EEM applet configuration results in polling an SNMP Object Identifier (OID) corresponding to the CPU 205 at, for example, a 5 second interval, and if the output result is greater than 80%, an event will be triggered. The action(s)—i.e., commands of 'enable' and 'undebug all'—result in generating a syslog (system log) message (e.g., *October 19 17:33:19.443: % HA_EM-4-LOG: CPU_LOAD: EEM applet executed due to high CPU). The configuration/functionality eliminates the exposure of spiking CPU to 100%, which would create an outage.

Figure 5:
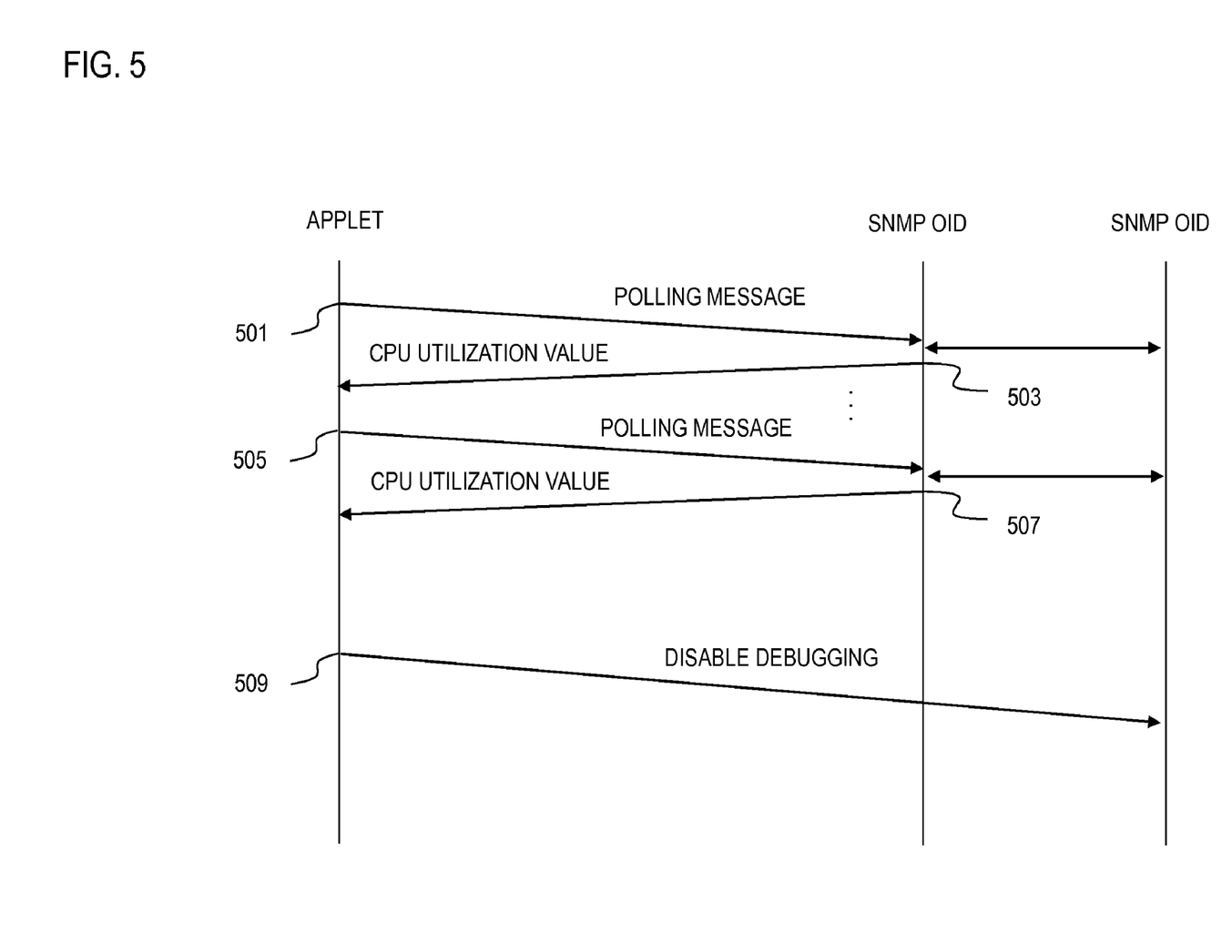
FIG. 5 is a diagram of a debugging process implemented using an applet, according to an exemplary embodiment.

FIG. 5 is a diagram of a debugging process implemented using an applet, according to an exemplary embodiment. Consistent with the example of FIG. 4, the applet transmits polling messages to the SNMP OID assigned to CPU utilization, per steps 501-507. The OID obtains the utilization of the CPU 205. Upon determining that the CPU utilization is above an acceptable utilization threshold, the applet sends a disable command to halt the debugging procedure, as in step 509.

Without this applet, careless debugging activity can result in sending an overwhelming amount of data to the router's CPU 205, thus resulting in router crashes, protocols dropping, customers being impacted, etc.

The above described processes relating to automatic disabling of network debugging may be implemented via software, hardware (e.g., general processor, DSP chip, an application specific integrated circuit (ASIC), field programmable gate arrays (FPGAs), etc.), firmware, or a combination thereof. Such exemplary hardware for performing the described functions is detailed below.

FIG. 6 illustrates a computer system 600 upon which an embodiment according to an exemplary embodiment can be implemented. For example, the processes described herein can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment contemplated herein, the processes described are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement certain embodiments. Thus, the exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA)

or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
    generating a debugging command to initiate a debugging process for a router that includes a processor; and
    transmitting the debugging command to the router to execute the debugging process and to disable the debugging process in response to the processor satisfying a predetermined utilization threshold.

2. A method as recited in claim 1, wherein a network management object is assigned to track the utilization of the processor, the method further comprising:
    periodically polling the network management object to determine the utilization.

3. A method as recited in claim 1, wherein a network management object is defined according to a Simple Network Management Protocol (SNMP).

4. A method as recited in claim 1, further comprising:
    selecting the router among a plurality of routers forming a data network, the debugging process being initiated to determine performance of the data network.

5. A method as recited in claim 1, wherein the disabling of the debugging process is performed according to an event policy that specifies one or more events associated with operation of the router.

6. A method as recited in claim 5, wherein the event policy is implemented by an applet that is configured to execute the disabling of the debugging process, the method further comprising:
    distributing the applet to the router.

7. An apparatus comprising:
    a processor configured to generate a debugging command to initiate a debugging process for a router that includes a central processing unit; and
    a communication interface configured to transmit the debugging command to the router to execute the debugging process and to disable the debugging process in response to the central processing unit satisfying a predetermined utilization threshold.

8. An apparatus as recited in claim 7, wherein a network management object is assigned to track the utilization of the processor, the processor being further configured to determine to periodically poll the network management object to determine the utilization.

9. An apparatus as recited in claim 7, wherein the network management object is defined according to a Simple Network Management Protocol (SNMP).

10. An apparatus as recited in claim 7, wherein the processor is further configured to select the router among a plurality of routers forming a data network, the debugging process being initiated to determine performance of the data network.

11. An apparatus as recited in claim 7, wherein the disabling of the debugging process is performed according to an event policy that specifies one or more events associated with operation of the router.

12. An apparatus as recited in claim 11, wherein the event policy is implemented by an applet that is configured to execute the disabling of the debugging process, the processor being further configured to distribute the applet to the router.

13. An apparatus comprising:
    a memory configured to store routing information for routing packets;
    a central processing unit;
    a debugging control logic coupled to the central processing unit and configured to disable a debugging process based on utilization of the central processing unit; and
    a switching fabric configured to route the packets.

14. An apparatus as recited in claim 13, wherein a network management object is assigned to track the utilization of the central processing unit, the network management object being polled periodically to determine the utilization.

15. An apparatus as recited in claim 13, wherein the network management object is defined according to a Simple Network Management Protocol (SNMP).

16. An apparatus as recited in claim 13, wherein an event policy defines an event and an action corresponding to the utilization of the central processing unit, the event policy including an applet to terminate the debugging procedure.

17. An apparatus as recited in claim 13, further comprising:
    a counter event detector configured to track utilization of the central processing unit; and
    an event manager coupled to the counter event detector and configured to monitor the central processing unit.

18. An apparatus as recited in claim 13, wherein the apparatus is maintained by a service provider and serves a plurality of subscribers.

19. An apparatus as recited in claim 18, wherein one or more of the subscribers are authorized to initiate the debugging procedure.

20. An apparatus as recited in claim 19, wherein the apparatus is part of a routing network, the debugging process being initiated to determine performance of the routing network.

* * * * *